United States Patent [19]

Boatwright

[11] Patent Number: 4,857,691

[45] Date of Patent: Aug. 15, 1989

[54] BURNABLE ABSORBER ROD END PLUG WELDING APPARATUS AND METHOD

[75] Inventor: David A. Boatwright, Columbia, S.C.

[73] Assignee: Westinghouse Electric Corp., Pittsburgh, Pa.

[21] Appl. No.: 201,224

[22] Filed: Jun. 2, 1988

[51] Int. Cl.⁴ .............................................. B23K 9/225
[52] U.S. Cl. ..................................... 219/60 R; 219/61; 219/125.11
[58] Field of Search ................. 219/60 R, 61, 125.11, 219/136

[56] References Cited

U.S. PATENT DOCUMENTS

| | | | |
|---|---|---|---|
| 3,068,343 | 12/1962 | Rössner | 219/60 R |
| 3,510,398 | 5/1970 | Wood | 176/86 |
| 3,725,635 | 4/1973 | Fink et al. | 219/121 P |
| 4,075,454 | 2/1978 | Duncan et al. | 219/137 R |
| 4,188,521 | 4/1980 | Yeo | 219/60 A |
| 4,460,540 | 7/1984 | Funk et al. | 376/327 |
| 4,570,051 | 2/1986 | Miwa | 219/61 |
| 4,626,404 | 12/1986 | Chubb | 376/447 |

*Primary Examiner*—Clifford C. Shaw

[57] ABSTRACT

A welding apparatus includes a housing defining a welding chamber and an access opening at one end thereof. The access opening allows an end of a tube fitted with an end plug to pass into and from a welding position within the chamber. An end stop for supporting the end plug at the welding position is rotatably mounted to the housing and disposed in the chamber opposite from and axially aligned with the chamber access opening. The end stop has an annular collar-like portion adapted to fit over and engage the exterior of the end plug. The end stop also has an inner hollow tube-like portion adapted to fit into a central passage of the end plug and engage the interior of the end plug. The end stop has an orifice adapted to supply flow of inert cover gas into the end plug central passage and therefrom into the tube interior to purge air therefrom. Also, a welding assembly having an electrode with a leading end is mounted on a carriage which, in turn, is mounted on the housing for moving the welding assembly toward and away from welding chamber and thereby moving the electrode leading end toward and away from the tube and end plug between respective extended working position and retracted non-working positions. A drive mechanism is operable to rotate the tube and thereby rotate the tube end and end plug within the welding chamber and therewith the end stop engaged with the end plug.

22 Claims, 6 Drawing Sheets

BURNABLE ABSORBER ROD END PLUG WELDING APPARATUS AND METHOD

CROSS REFERENCE TO RELATED APPLICATION

Reference is hereby made to the following copending application dealing with related subject matter and assigned to the assignee of the present invention: "Fuel Rod End Plug Welding Apparatus and Method" by Anthony Boatwright et al, assigned U.S. Ser. No. 201,145 and filed 6/2/88 (W.E. 54,382)

BACKGROUND OF THE INVENTION

Field of the Invention

The present invention relates generally to burnable absorber rod manufacture and, more particularly, is concerned with an apparatus and method for welding an end plug on an inner tube of a burnable absorber rod.

Description of the Prior Art

The incorporation of burnable absorbers, also referred to as burnable poisons, in nuclear fuel assemblies has been recognized in the nuclear power generating field as an effective means of increasing fissionable material capacity and thereby extending reactor core life. Burnable absorbers, being parasitic neutron-capturing elements, are used either uniformly mixed with the fissionable material, deposited as a coating on the exterior of nuclear fuel pellets containing fissionable material, or placed as separate elements in the reactor core.

U.S. Pat. No. 3,510,398 to Wood, assigned to the assignee of the present invention, discloses an example of a separate burnable absorber rod. In the rod of the Wood patent, the burnable poison, boron, is found in a hollow stainless steel clad borosilicate glass tube contained within an outer cladding tube.

U.S. Pat. No. 4,460,540 to Funk et al, also assigned to the assignee of the present invention, discloses another example of a separate burnable absorber rod. In the rod of the Funk et al patent, hollow inner and outer tubes in a concentric arrangement provide an annular space therebetween which contains annular burnable poison pellets therein. The annular space is sealed at the opposite ends of the concentric hollow inner and outer tubes by end plugs. Reactor core coolant water is allowed to pass through an aperture in the bottom end plug upwardly through the inner tube and out of an aperture in the top end plug.

U.S. Pat. No. 4,626,404 to Chubb, also assigned to the assignee of the present invention, discloses still another example of a separate burnable absorber rod generally similar to the rod of the Funk et al patent. However, in the rod of the Chubb patent, the annular space between the concentric inner and outer tubes contains a metal cylindrical tube having burnable absorber material deposited over its outer surface.

Another known absorber rod generally similar to the rods of the Funk et al and Chubb patents employs a bottom end plug having an outer generally frusto-conical head portion and three generally cylindrical neck portions. The end plug also has a central passage for allowing flow of reactor coolant therethrough. The neck portions are tandemly arranged and of increasingly smaller diameter than the maximum diameter of the head portion proceeding away from the head portion from the outer one to the inner one of the neck portions. As a result of the diameter differences between the three neck portions themselves and also with respect to the outer head portion, an abutment or shoulder is formed at each transition from one neck portion to the next and to the outer head portion.

The outside diameter of the inner neck portion is slightly less than the inside diameter of the inner tube of the rod so that the end portion of the tube will slip over the inner neck portion and abut against the inner one of the shoulders. The same relationships hold with respect to the outside diameters of the middle and outer ones of the neck portions and the inside diameters of the middle and outer tubes of the rd so that the end portions of the middle and outer tubes will slip over the corresponding middle and outer neck portions and abut against the middle and outer ones of the shoulders. Typically, the end portions of the inner and outer tubes are welded to the end plug at the inner and outer end plug shoulders.

The first weld formed is the one found between the end portion of the inner tube of the rod and the inner shoulder between the inner and middle neck portions of the end plug. In the past, this weld has been formed by holding the rod stationary and orbiting or revolving a welding apparatus about the end plug. The welding apparatus employed a clam shell-type of housing or weld chamber for holding the tube with the end plug thereon. The weld chamber opened to allow placement of the larger diameter head portion of the end plug therein past a welding electrode and then closed to begin the welding operation.

Even though care was ordinarily taken to place the end plug in the housing without touching the electrode, bumping of the electrode would inadvertently occur from time to time. Such slight contact with the electrode frequently resulted in sufficient misalignment between it and the end plug that a girth weld could not be accurately formed at the interface of the end of the tube and the inner shoulder of the end plug.

One alternative approach to welding end plugs to tubes is disclosed in U.S. Patents to Fink et al (3,725,635), Duncan et al (4,075,454) and Yeo (4,188,521), which are all assigned to the same assignee as the present invention. The approach of these patents is to insert the tube with the end plug thereon into a welding chamber in alignment with a stationary welding electrode and then rotate the tube and plug as a girth weld is formed at the interface between the end plug and tube end. However, this approach does not appear to provide a solution to the problem of how to reliably insert a larger diameter head portion of an end plug past a welding electrode without bumping it in view that the electrode needs to be positioned close enough to the smaller diameter tube end to complete a girth weld between it and the end plug.

Consequently, a need still exists for a different approach to the end plug welding operation which will allow the larger diameter head portion of an end plug fitted into a tube to reliably clear the welding electrode as the end plug is being inserted axially into the weld chamber.

SUMMARY OF THE INVENTION

The present invention provides an end plug welding apparatus and method designed to satisfy the aforementioned needs. The welding apparatus of the present invention employs a welding assembly movable toward and away from a welding chamber for permitting insertion of the enlarged end plug head portion past the welding electrode of the welding apparatus without danger of inadvertent contact with the same. Also, the welding apparatus includes an improved end stop for making contact with the end plug at separate spaced locations for enhanced stabilized support thereof the tube and end plug are rotated during the welding operation.

Accordingly, the present invention is directed to an apparatus for welding an end of a hollow tube to an end plug having a central passage defined therethrough. The welding apparatus comprises: (a) a stationary housing defining a welding chamber and an access opening at one end of the chamber to allow passage of the tube end fitted with the end plug therethrough to and from a welding position within the chamber; (b) an end stop rotatably mounted to the housing and disposed in the chamber opposite from and axially aligned with the chamber access opening, the end stop being configured to engage the end plug on the tube end at the welding position for supporting the same within the chamber; (c) a welding assembly having an electrode with a leading end; (d) means supporting the welding assembly with the electrode leading end disposed within the welding chamber, the supporting means being mounted on the housing for movement toward and away from the chamber for moving the electrode leading end toward and away from the tube and end plug between respective extended working position and retracted non-working positions; and (e) drive means being operable to rotate the tube and thereby rotate the tube end and end plug within the welding chamber and therewith the end stop engaged with the end plug.

More particularly, the end stop has an outer portion being configured to engage the exterior of the end plug and an inner portion being configured to engage the interior of the end plug within its central passage. Preferably, the outer portion of the end stop has an annular collar-like configuration adapted to fit over the exterior of the end plug and make contact With an exterior surface portion thereof. Preferably, the inner portion of the end stop has an elongated hollow tube-like configuration adapted to fit into the central passage of the end plug and make contact with an interior surface portion thereof. Also, the inner portion of the end stop has an orifice adapted to communicate with the central passage of the end plug for supplying a flow of inert cover gas into the interior of the hollow tube to purge atmospheric air therefrom. Further, means are associated with the welding assembly for supplying a flow of inert cover gas past the electrode into the chamber and about the exterior of the tube end and end plug for purging atmospheric air from the chamber.

Still further, the welding assembly supporting means of the apparatus includes a carriage rigidly mounting the welding assembly and having an elongated guide member, guide rollers rotatably mounted to the housing and disposed on opposite sides of guide member so as to mount the guide member and thereby the carriage and the welding assembly electrode therewith for movement along a rectilinear path relative to the guide rollers toward and away from the welding chamber, and an actuator mounted on the housing and coupled to the carriage, the actuator being operable for causing movement of the carriage along its rectilinear path.

Preferably, the guide member has guide surfaces defined along respective opposite longitudinal edges thereof, whereas the guide rollers have circumferential grooves which mate with the guide surfaces of the guide member. Also, the carriage includes adjustable stops being operable for presetting the limits of movement of the carriage along its rectilinear path and thereby movement of the welding assembly electrode relative to the welding chamber.

The present invention is also directed to a method of welding a hollow tube to an end plug having a central passage defined therethrough. The welding method comprises the steps of: (a) moving an electrode of a welding assembly away from an extended working position to a retracted non-working position relative to a welding chamber defined in a housing; (b) inserting the end of the tube with the end plug fitted thereon through an access opening in the housing and into a welding position in the welding chamber of the housing; (c) placing the end plug in contact with a rotatable end stop disposed in the chamber opposite from and axially aligned with chamber access opening such that the end stop engages the end plug on the tube end at the welding position for supporting the same within the chamber; (d) moving the electrode of the welding assembly away from its retracted non-working position to its extended working position relative to the welding chamber; and (e) rotating the tube and thereby the tube end and end plug within the welding chamber and therewith the end stop engaged with the end plug as the welding assembly is operated to perform a welding operation.

More particularly, the placing step includes concurrently engaging an outer portion of the end stop with an exterior surface portion of the end plug and engaging an inner portion of the end stop with an interior surface portion of the end plug within its central passage. Also, the method further includes the step of supplying a flow of inert cover gas through the end stop into the interior of the hollow tube via the central passage of the end plug to purge atmospheric air therefrom.

These and other advantages and attainments of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings in which.

DETAILED DESCRIPTION OF THE INVENTION

Figures 1, 2:
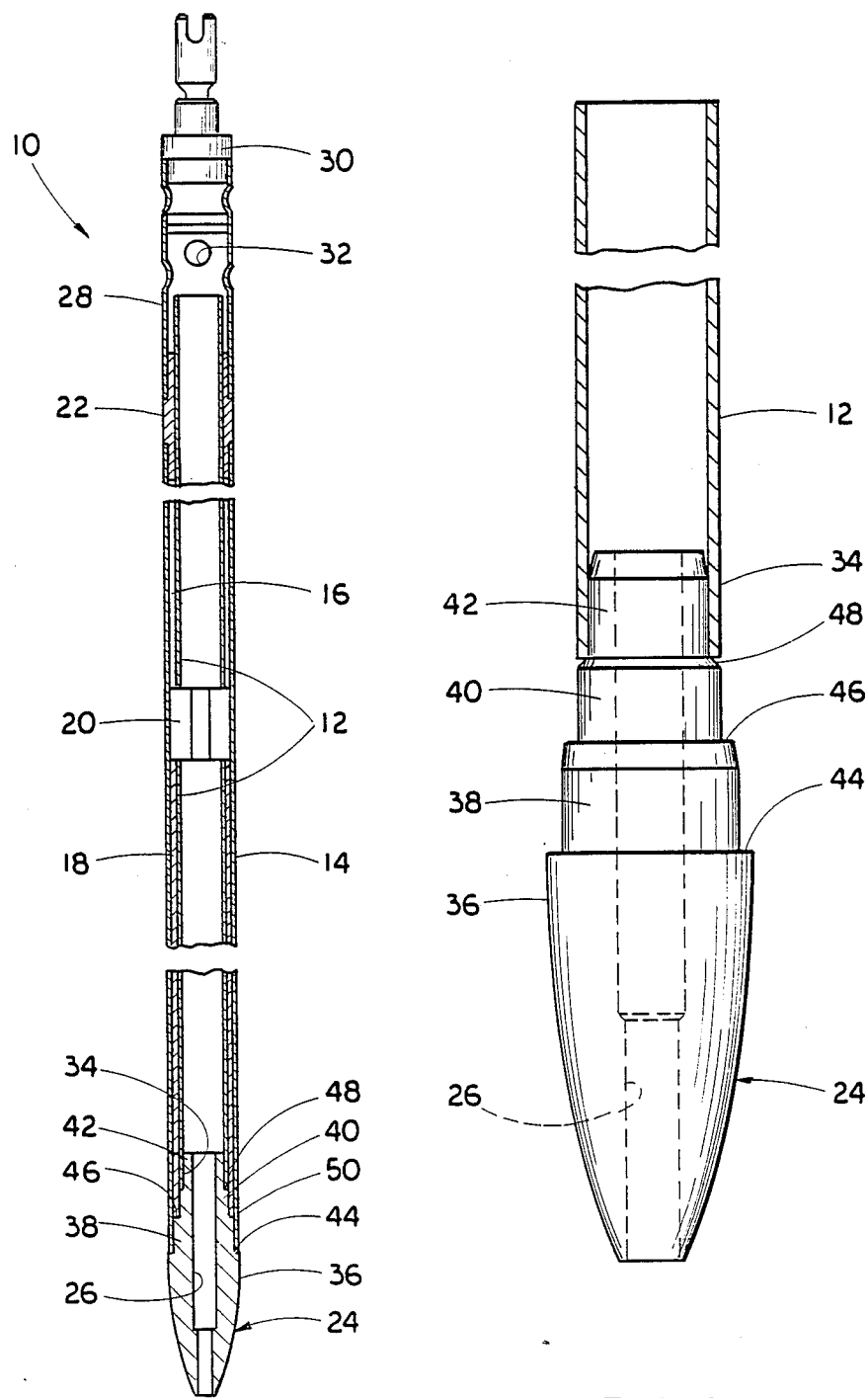
FIG. 1 is a longitudinally foreshortened, axial sectional view of a conventional burnable absorber rod having a bottom end plug welded to an inner tube of the rod by the apparatus and method of the present invention.
FIG. 2 is an enlarged sectional view of the bottom portion of the inner tube of the absorber rod of FIG. 1 and an enlarged elevational view of the bottom end plug of the rod fitted to the bottom end portion of the inner tube.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Prior Art Burnable Absorber Rod

Referring now to the drawings, and particularly to FIGS. 1 and 2, there is illustrated a conventional burnable absorber rod, generally designated by the numeral 10. As will be described later on in reference to FIGS. 3 to 11, some of the parts of the absorber rod 10 are assembled by the welding apparatus and method of the present invention.

The absorber rod 10 basically includes a pair of metal cylindrical hollow inner and outer tubes 12,14 disposed in a concentric arrangement so as to provide an annular space 16 therebetween which contains a plurality of thin annular pellets of burnable absorber material held in a stack 18 by a spring clip 20. The annular space 16 is sealed at the upper end by a solid ring 22 and at the bottom end by a bottom end plug 24. The bottom end plug 24 has a central passage 26 which allows reactor core coolant water to pass into the rod. A short section of the outer tube 28 is attached to and extends upwardly from the solid ring 22. A solid top end plug 30 is attached to the outer tube section 28. At least one aperture 32 is defined in the outer tube section 28 for allowing exit of coolant from the rod 10 after passing upwardly through the inner tube 12 thereof.

The first and most difficult attachment or weld made in the manufacture of the rod 10 is between the bottom end 34 of the inner tube 12 and the bottom end plug 24. The bottom end plug 24 of the absorber rod 10 has an outer generally frusto-conical head portion 36 and three generally cylindrical neck portions 38,40,42. The central passage 26 of the bottom end plug 24 for allowing reactor coolant flow passes through all of the portions 36-42 of the end plug. The neck portions 38,40,42 are tandemly arranged and have increasingly smaller diameters than the maximum diameter of the head portion 36 proceeding from the outer neck portion 38 to the inner neck portion 42. As a result of the diameter differences between the three neck portions themselves and also with respect to the outer head portion, an abutment or shoulder 44,46,48 is formed at each transition from the head portion to the outer neck portion and from one neck portion to the next.

The outside diameter of the inner neck portion 42 is slightly less than the inside diameter of the inner tube 12 of the rod so that the bottom end 34 of the inner tube 12 will slip snugly over the inner neck portion 42 and abut against the inner shoulder 48. The same relationship holds with respect to the outside diameter of the outer neck portion 38 and the inside diameter of the outer tube 14 of the rod so that the bottom end 50 of the outer tube 14 will slip snugly over the outer neck portion 38 and abut against the outer shoulder 44. Typically, the bottom ends 34,50 of the inner and outer tubes 12,14 are welded to the bottom end plug 24 in the regions of the corresponding inner and outer shoulders 48,44.

Welding Apparatus of the Present Invention

Turning now to FIGS. 3 to 11, there is illustrated an welding apparatus, generally designated by the numeral 52 and constituting the preferred embodiment of the present invention. The welding apparatus 52, a)though not so limited, is adapted particularly for welding the bottom end 50 of the inner tube 12 to the inner shoulder 48 on the bottom end plug 24. The welding apparatus 52 basically includes a stationary housing 54 defining a welding chamber 56, an elongated rotatable support member 58 mounting an end stop 60, a welding assembly 62 having an elongated electrode 64, a support carriage assembly 66 mounting the welding assembly 62 and electrode 64 for movement relative to the housing 54, and a drive mechanism 68, such as a rotatably driven chuck, for receiving, engaging and rotating the absorber rod 10.

The welding assembly 62, electrode 64 and the drive mechanism 68 are conventional and well known per se in their constructions and modes of operation; therefore, they need not be illustrated in detail herein for gaining a clear and complete understanding of the present invention. The improvements provided in the welding apparatus 52 relate primarily to the configuration of the end stop 60 and way it supports the end plug 24 and to the movable support carriage assembly 66 which mounts the weld assembly 62 and the electrode 64 therewith for movement toward and away from the welding chamber 56.

More particularly, in addition to defining the welding chamber 56, the housing 54 of the welding apparatus 52 incorporates a bushing 70 which defines an access opening 72 at one end of the chamber 56. The access opening 72 is of a diameter size large enough to allow passage of the head portion 36 of the bottom end plug 24 which, as explained earlier, is larger in diameter than the bottom end 34 of the inner tube 12 and the middle neck portion 40 of the end plug 24. Thus, once the tube end 34 with the end plug 24 fitted thereon has been inserted through the access opening 72 to the welding portion within the chamber 56, a portion of the inner tube which remains extending through the opening 72 is substantially smaller in diameter that the opening 72. Therefore, an annular air gap 74 will exist between the larger diameter of the access opening 72 and the smaller diameter of the inner tube 12 extending through the opening 72, whereby the welding chamber 56 is not sealed as the welding operation is being carried out in the chamber 56.

The elongated support member 58 of the welding apparatus 52 mounts the end stop 60 which, in turn, accurately supports the end plug 24 within the welding chamber 56. The support member 58 extends through, and is rotatably mounted by spaced bearings 76 to, a tubular casing 78 incorporated by the housing 54 for highly accurate and true rotation of the support member 58 about the axis of the tube 12. Also, the support member 58 is hollow so as to define a channel 80 extending through it for supplying a flow of inert cover gas from a manifold 82 to the end stop 60 mounted to the inner end of the support member 58. The end stop 60 is fixed to the support member 58 for rotation therewith. The support member 58 disposes the end stop 60 at an end of the welding chamber 56 opposite from and in axial alignment with the access opening 72.

For ensuring highly accurate and stable support of the end plug 24 at the welding position within the welding chamber 56 for true rotation with the tube 12 about the rotational axis thereof, the end stop 60 has a configuration which makes frictional engagement with the end plug 24 concurrently at two spaced and separate locations thereon. Referring specifically to FIGS. 6 to 9, an outer portion 84 of the end stop 60 having an annular collar-like configuration fits over and frictionally engages the exterior of the end plug 24 about its enlarged diameter head portion 36 so as to make contact with a continuous exterior circumferential surface thereof. Concurrently, an inner portion 86 of the end stop 60 having an elongated hollow tube-like configuration fits into and frictionally engages the interior of the end plug 24 within its central passage 26 so as to make contact with a continuous interior circumferential surface thereof.

Furthermore, the inner hollow tube-like portion 86 of the end stop 60 defines an orifice 88 in communication with the channel 80 through the support member 58 and with the central passage 26 of the end plug 24. Thus, a flow of inert cover gas, such as helium, is supplied from the manifold 82 into the interior of the tube 12, via the support member channel 80, end stop orifice 88 and end plug central passage 26, for purging atmospheric air, i.e. oxygen, from the interior of the tube 12 out through an opposite open end thereof.

Figure 3:
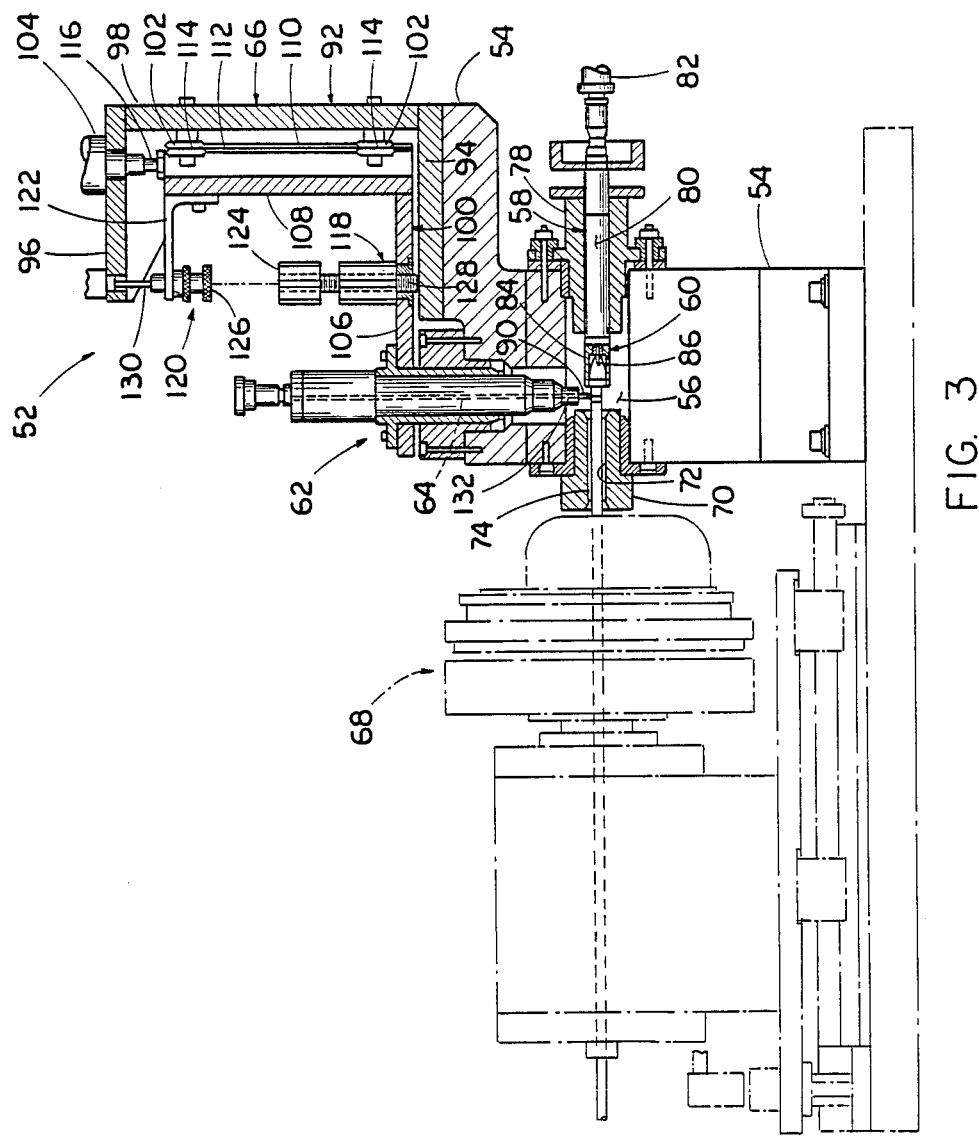
FIG. 3 is an axial sectional view of the welding apparatus of the present invention.
Figure 4:
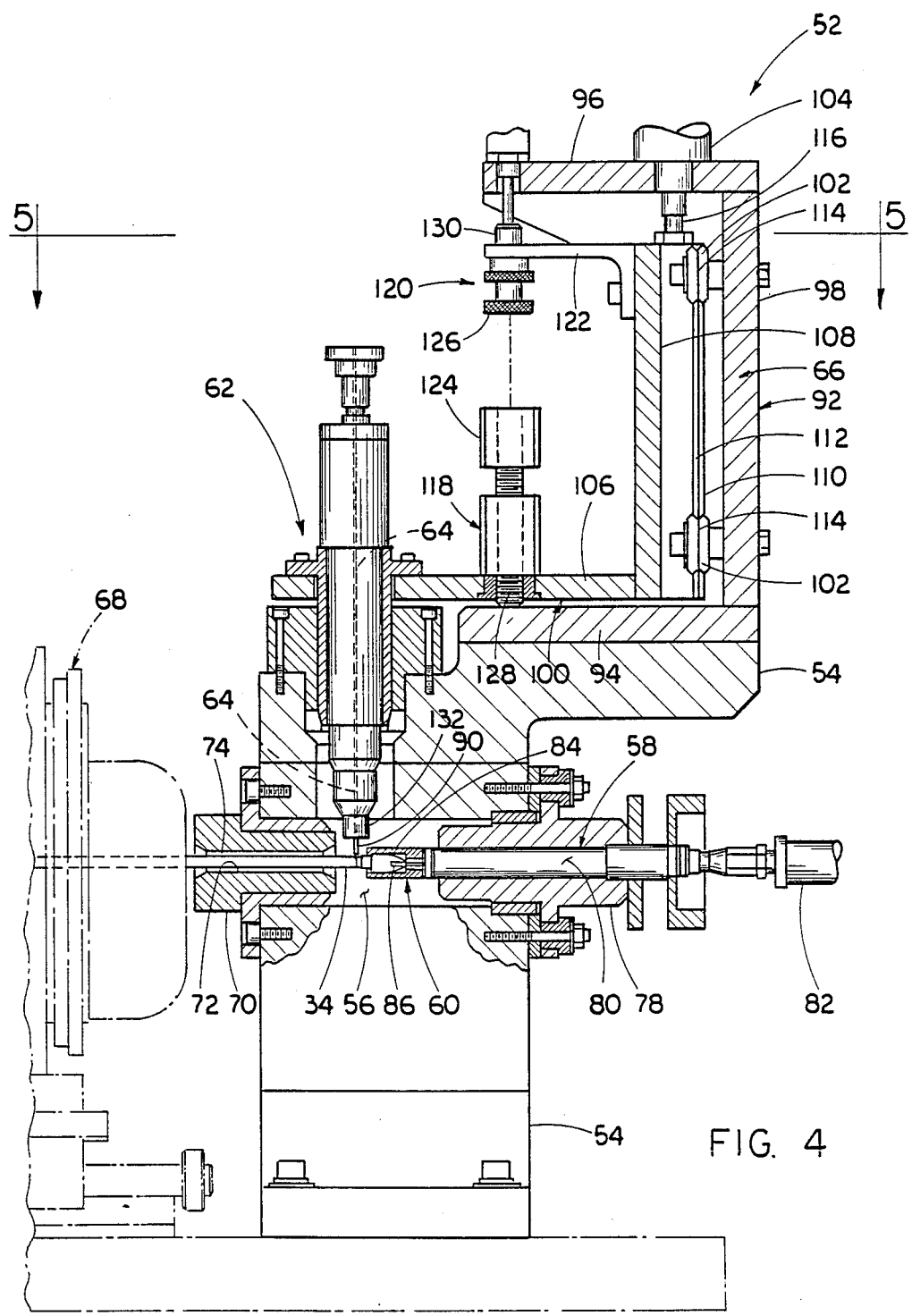
FIG. 4 is an enlarged fragmentary axial sectional view of the welding apparatus of FIG. 3, with the tube engaging and driving components of apparatus being omitted.
Figure 5:
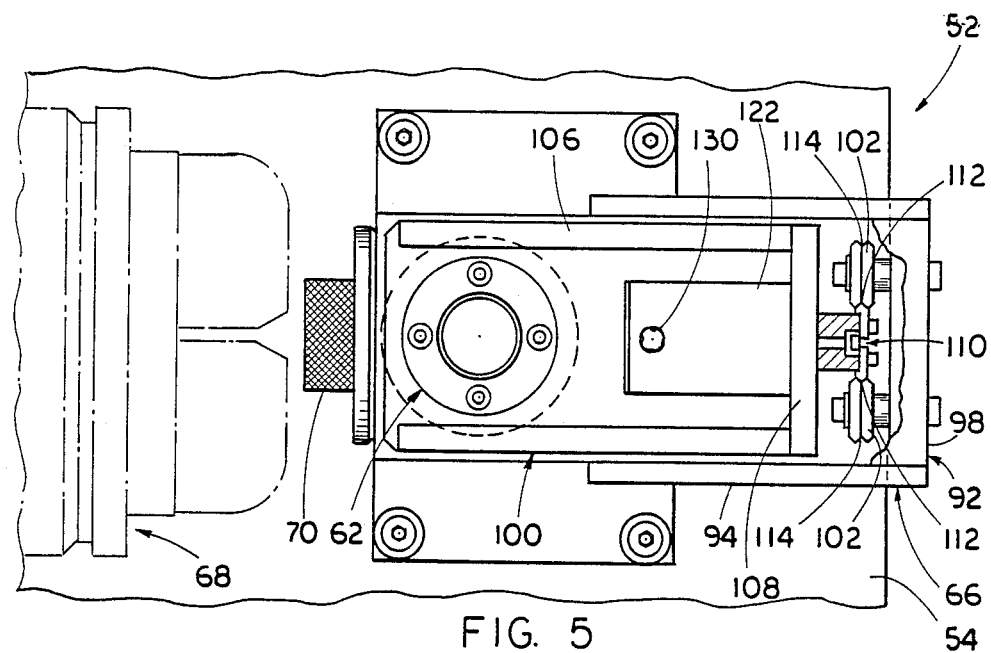
FIG. 5 is a top plan view of the welding apparatus as seen along line 5—5 of FIG. 4.
Figure 6:
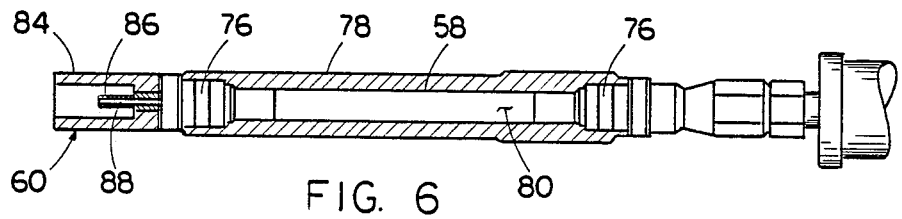
FIG. 6 is an enlarged axial sectional view of an end stop support member of the welding apparatus of FIG. 4, with the member being shown removed from the apparatus.
Figure 7:
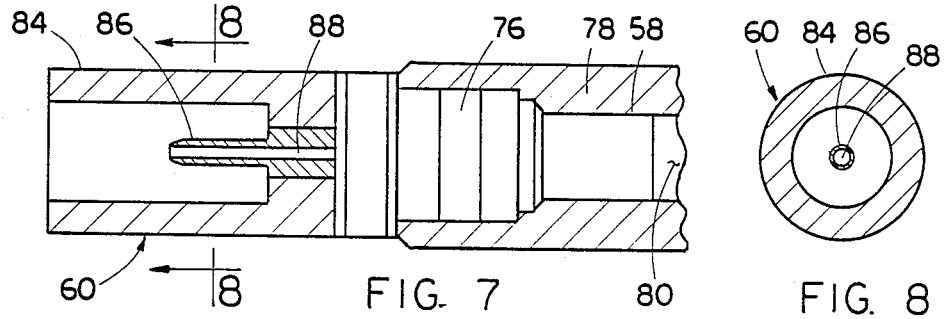
FIG. 7 is an enlarged fragmentary axial sectional view of the end stop support member of FIG. 6, showing details of the end stop which engages and supports the end plug.
Figure 8:
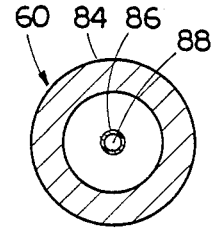
FIG. 8 is a cross-sectional view of the end stop taken along line 8—8 of FIG. 7.
Figure 9:
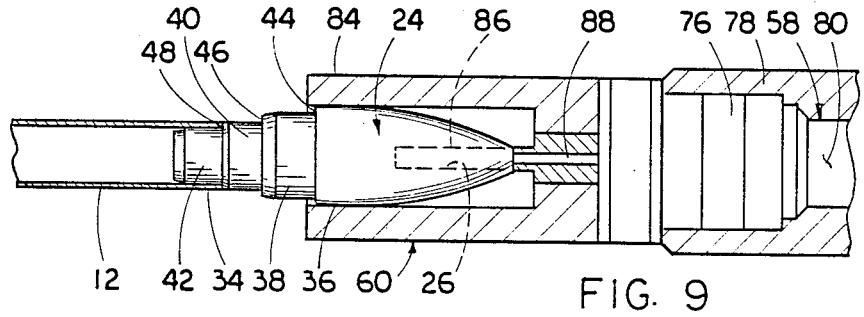
FIG. 9 is a view similar to that of FIG. 7, but also showing the end plug supported by the end stop.

As best seen in FIGS. 3 to 5, the support carriage assembly 66 of the welding apparatus 52 supports the welding assembly 62 with a leading end 90 of its electrode 64 disposed within the welding chamber 56. The support carriage assembly 66 is associated with a generally reverse C-shaped portion 92 of the stationary housing 54 of the welding apparatus 52. The housing portion 92 is composed of a lower horizontal plate 94, an upper horizontal plate 96 overlying the platform 94, and an upright back plate 98 which extends between and rigidly connects with the lower and upper plates 94,96.

The support carriage assembly 66 basically includes a carriage 100, a plurality of guide rollers 102 and an actuator 104. The carriage 100 has horizontal and vertical legs 106,108 connected so as to have a generally L-shaped configuration. The carriage horizontal leg 106 at its outer end rigidly mounts the welding assembly 62. The vertical leg 108 of the carriage 100 has an elongated guide member 110 attached thereon. The vertical guide member 110 has generally V-shaped outwardly pointing guide surfaces 112 defined along respective opposite longitudinal edges thereof. The guide rollers 102, preferably four in number, are grouped in two sets with two guide rollers in each set. The sets of guide rollers 102 are rotatably mounted to upright housing plate 98 at locations spaced downwardly and upwardly from respective upper and lower corners formed by the plates 94-98 of the housing portion 92. Also, the guide rollers 102 in each set are respectively disposed on opposite sides of the guide member 110 adjacent the guide surfaces 112 thereon. The guide rollers 102 have circumferential V-shaped grooves 114 which mate with the V-shaped guide surfaces 112 on the guide member 110.

With such an arrangement, the guide rollers 102 mount the guide member 110 and thereby the carriage 100 and welding assembly 62 and its electrode 64 therewith for movement along a highly accurate and true rectilinear path relative to the guide rollers 102 and housing 54 toward and away from the welding chamber 56. The actuator 104, preferably in the form of an air cylinder, is mounted above the upper plate 94 of the housing portion 92 and coupled at its piston rod end 116 to the guide member 110 of the carriage 100. Operation of the actuator 104 to cause extension and retraction of its piston rod will cause reciprocal movement of the carriage 100 and welding assembly 62 along the rectilinear path.

Further, the carriage 100 includes lower and upper rotatably adjustable stop mechanisms 118,120 mounted respectively to the carriage horizontal leg 106 and to a bracket 122 fixed to the upper end of the carriage vertical leg 108. By turning respective knobs 124,126 of the stop mechanisms 118,120, the locations of contact of ends of movable shafts 128,130 connected to the respective knobs 124,126 with the respective lower and upper plates 94,96 of the housing portion 92 can be preset relative to the position of the carriage 100 along its path of movement. In such manner, the end limits of movement of the carriage 100 along its rectilinear path are preset as are the limits of movement of the welding assembly electrode 64 relative to axis of the tube 12 in the welding chamber 56.

The drive mechanism 68 of the welding apparatus 52 for rotating the tube 12 is positioned adjacent the housing access opening 72 outside the welding chamber 56. It is operable to receive, grip and rotate the tube 14 and thereby rotate the tube end 34 and end plug 24 within the welding chamber 56 and also the end stop 60 frictionally engaged with the end plug 24. Further, a flow of inert cover gas, such as helium, is supplied into the welding chamber 56 and about the exterior of the tube end 34 and end plug 24 for purging atmosphere air (oxygen) from the chamber 56 out through the annular air gap 74 about the tube 12 in the bushing access opening 72. Preferably, the flow of cover gas into the chamber 56 emanates from the welding assembly 62 along the electrode 64 from a nozzle 132 encompassing the electrode 64. However, other ways to supply the cover gas can be used.

Figure 10:
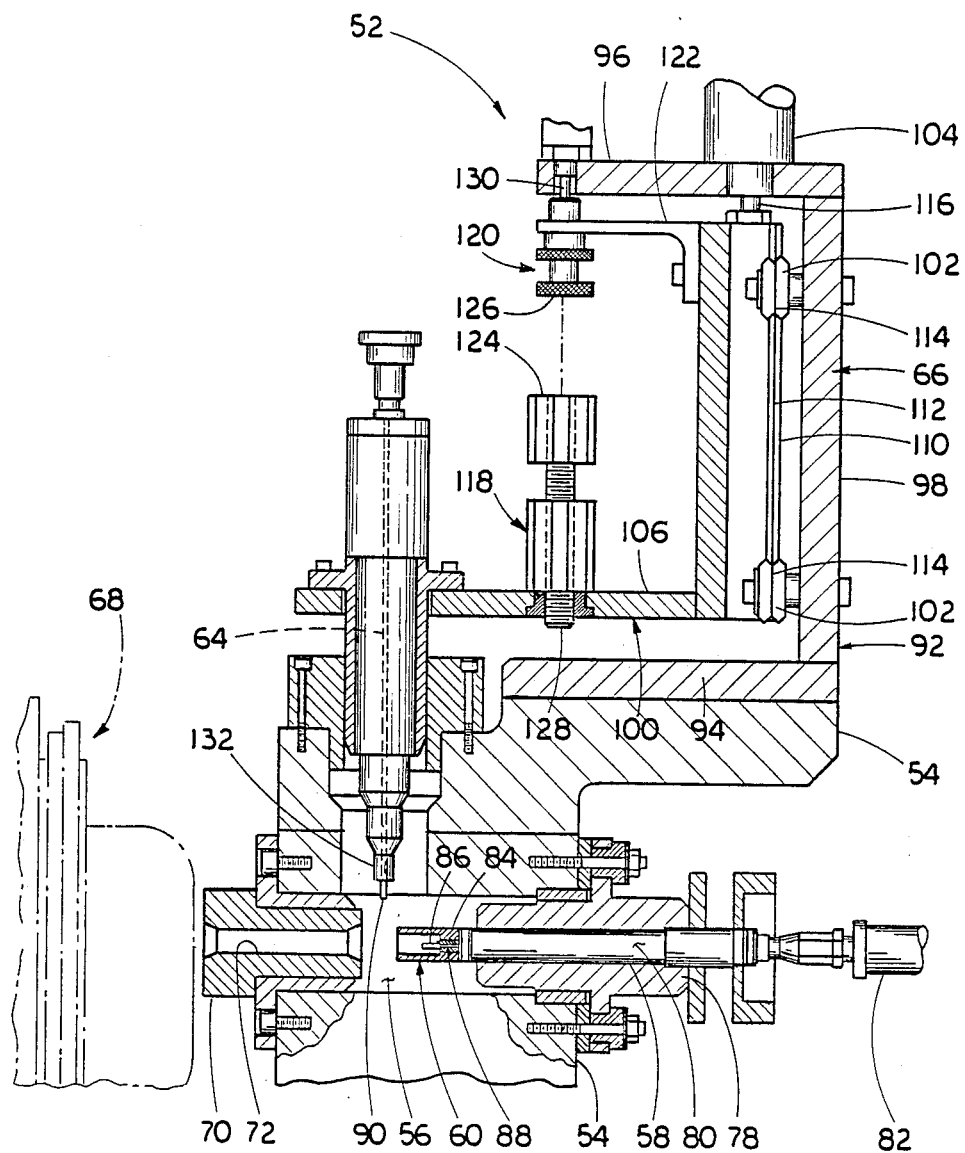
FIGS. 10 and 11 are fragmentary axial sectional views of the welding apparatus of FIG. 4, showing sequential stages in operation of the welding apparatus in accordance with the method of the present invention.
Figure 11:
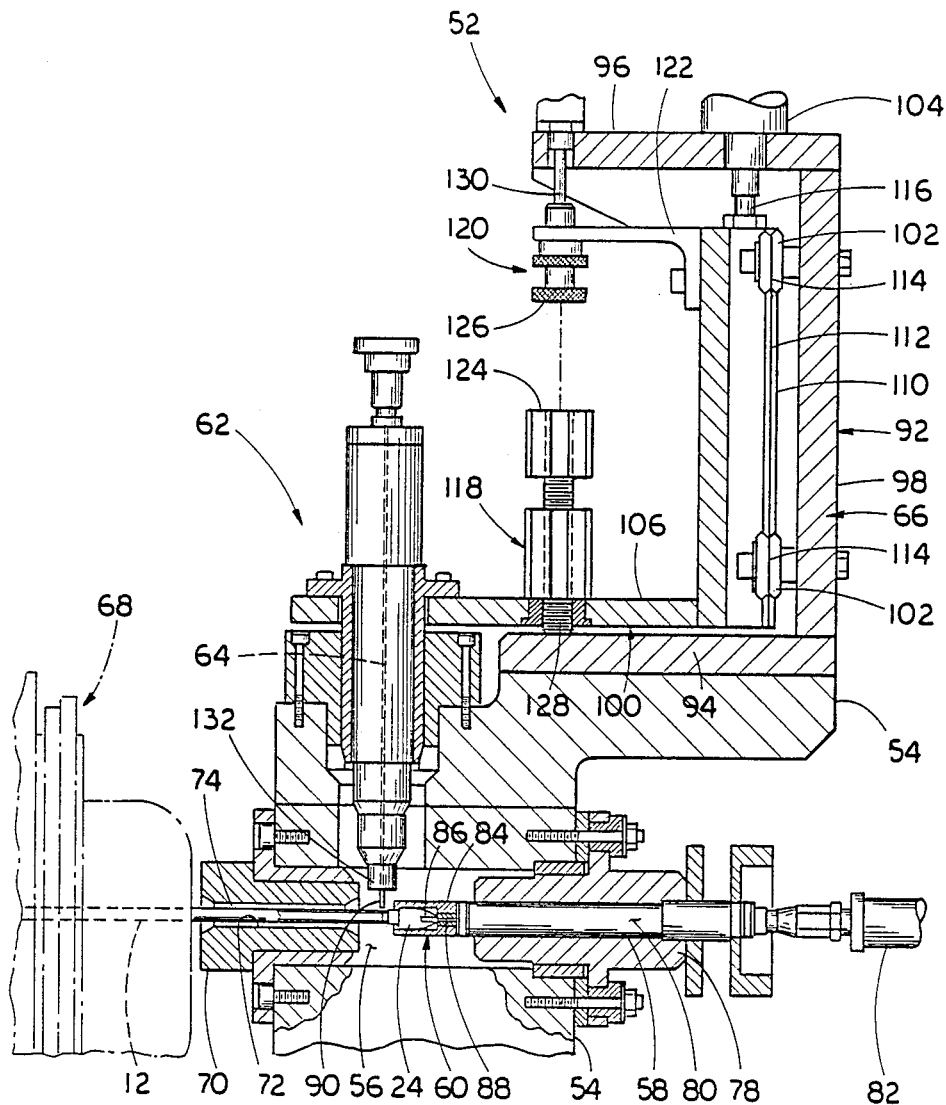

Turning now to FIGS. 10 and 11, there is illustrated two sequential stages of the welding apparatus 52 in carrying out welding of the end plug 24 at the inner shoulder 48 thereof to the bottom end 34 of the inner tube 12. FIG. 10 shows the welding apparatus 52 before the tube 12 fitted with the end plug 24 is inserted into the welding chamber 56. The actuator 104 has been operated to move the carriage 100 and the electrode 64 of the welding assembly 62 relative to the welding chamber 56 away from an extended working position (FIG. 11) to a retracted non-working position (FIG. 10). At the extended working portion (FIG. 11), the leading end 90 of the electrode 64 is disposed close enough (about 0.020 inch) to the tube end 34 and end plug shoulder 48 (when they are disposed at the welding position in the welding chamber 56) to perform a welding operation. However, in the working position of FIG. 10, the electrode leading end 90 will interfere with movement of the enlarged diameter head portion 36 of the end plug 24 past the it. On the other hand, in retracted non-working position of FIG. 11, the electrode leading end 90 is withdrawn far enough away from the tube end 34 and end plug 24 to allow movement of the enlarged diameter head portion 36 of the end plug 24 past it.

With the electrode 62 at its retracted non-working position, the end 34 of the tube 12 with the end plug 24 fitted thereon is received in the drive mechanism 68 and inserted through housing bushing access opening 72 and into the welding position in the welding chamber 56, as seen in FIG. 11. This places the end plug 24 in contact with the rotatable end stop 60 disposed in the chamber 56 opposite from and axially aligned with chamber access opening 72 such that the end stop 60 frictionally engages the end plug 24 concurrently at the two spaced exterior and interior locations thereon for supporting the same within the chamber 56.

With the end plug 24 at the welding position in the chamber 56, the welding assembly 62 and its electrode 64 can now be moved away from the retracted non-working position of FIG. 10 to the extended working position of FIG. 11, placing the leading end 90 of the electrode 62 typically about 0.020 inch from the end plug 24. Now, the drive mechanism 68 is operated to rotate the tube 12 and thereby the tube end 34 and end plug 24 within the welding chamber 56 and therewith the end stop 60 frictionally engaged with the end plug 24 concurrently as the welding assembly 62 is operated to perform a welding operation. Also, concurrently inert cover gas is supplied both into the tube and about it to purge atmospheric air therefrom.

Once the welding operation is completed, the welding assembly 62 and the electrode 64 therewith are again retracted to the non-working position of FIG. 11 to allow withdrawal of the tube 14 with the end plug welded thereon from the welding chamber 56.

It is thought that the present invention and many of its attendant advantages will be understood from the foregoing description and it Will be apparent that various changes may be made in the form, construction and arrangement thereof without departing from the spirit and scope of the invention or sacrificing all of its material advantages, the form herein before described being merely a preferred or exemplary embodiment thereof.

I claim:

1. An apparatus for welding an end of a hollow tube to an end plug having a central passage defined therethrough, said welding apparatus comprising:
   (a) a stationary housing defining a welding chamber and an access opening at one end of said chamber to allow passage of the tube end fitted with the end plug therethrough to and from a welding position within said chamber;
   (b) an end stop rotatably mounted to said housing and disposed in said chamber opposite from and axially aligned with said chamber access opening, said end stop being configured to engage the end plug on the tube end at said welding position for supporting the same within said chamber;
   (c) a welding assembly having an electrode with a leading end;
   (d) means supporting said welding assembly with said electrode leading end disposed within said welding chamber, said supporting means being mounted on said housing for movement toward and away from said chamber for moving said electrode leading end toward and away from the tube and end plug between respective extended working position and retracted non-working positions; and
   (e) drive means being operable to rotate the tube and thereby rotate the tube end and end plug within said welding chamber and thereby said end stop engaged with the end plug.

2. The apparatus as recited in claim 1, wherein said end stop has an outer portion being configured to engage the exterior of the end plug and an inner portion being configured to engage the interior of the end plug within its central passage.

3. The apparatus as recited in claim 2, wherein said outer portion of said end stop has an annular collar-like configuration adapted to fit over the exterior of the end plug and make contact with a continuous exterior circumferential surface portion thereof.

4. The apparatus as recited in claim 2, wherein said inner portion of said end stop has an elongated hollow tube-like configuration adapted to fit into the central passage of the end plug and make contact with a continuous interior circumferential surface portion thereof.

5. The apparatus as recited in claim 2, wherein said inner portion of said end stop has an orifice adapted to communicate with the central passage of the end plug for supplying a flow of inert cover gas into the interior of the hollow tube to purge atmospheric air therefrom.

6. The apparatus as recited in claim 1, further comprising:
   (f) means for supplying a flow of inert cover gas into said chamber and about the exterior of the tube end and end plug for purging atmospheric air from said chamber.

7. The apparatus as recited in claim 1, wherein said welding assembly supporting means includes:
   a carriage rigidly mounting said welding assembly and having an elongated guide member;
   guide rollers rotatably mounted to said housing and disposed on opposite sides of said guide member so as to mount said guide member and thereby said carriage and said welding assembly electrode therewith for movement along a rectilinear path relative to said guide rollers toward and away from said welding chamber; and
   an actuator mounted on said housing and coupled to said carriage, said actuator being operable for causing movement of said carriage along its rectilinear path.

8. The apparatus as recited in claim 7, wherein said guide member has guide surfaces defined along respective opposite longitudinal edges thereof.

9. The apparatus as recited in claim 8, wherein said guide rollers have circumferential grooves which mate with said guide surfaces of said guide member.

10. The apparatus as recited in claim 7, wherein said carriage includes adjustable stops being operable for presetting the limits of movement of said carriage along its rectilinear path and thereby movement of said welding assembly electrode relative to said welding chamber.

11. The apparatus as recited in claim 7, wherein said end stop has an outer portion being configured to engage the exterior of the end plug and an inner portion being configured to engage the interior of he end plug within its central passage.

12. The apparatus as recited in claim 11, wherein said inner portion of said end stop has an elongated hollow tube-like configuration adapted to fit into the central passage of the end plug and make contact with a continuous interior circumferential surface portion thereof.

13. The apparatus as recited in claim 11, wherein said inner portion of said end stop has an orifice adapted to communicate with the central passage of the end plug for supplying a flow of inert cover gas into the interior of the hollow tube to purge atmospheric air therefrom.

14. The apparatus as recited in claim 11, wherein said outer portion of said end stop has an annular collar-like configuration adapted to fit over the exterior of the end plug and make contact with a continuous exterior circumferential surface portion thereof.

15. An apparatus for welding an end of a hollow tube to an end plug having a central passage defined therethrough, said welding apparatus comprising:
   (a) a stationary housing defining a welding chamber and an access opening at one end of said chamber to allow passage of the tube end fitted with the end plug therethrough to and from a welding position within said chamber;
   (b) an end stop rotatably mounted to said housing and disposed in said chamber opposite from and axially aligned with said chamber access opening, said end stop having an outer portion being configured to engage the exterior of the end plug and an inner portion being configured to engage the interior of the end plug within its central passage for supporting the end plug at the welding position within said chamber;
   (c) a welding assembly mounted on said housing and having an electrode with a leading end disposed within said welding chamber; and
   (d) drive means being operable to rotate the tube and thereby rotate the tube end and end plug within said welding chamber and thereby said end stop which supports the end plug.

16. The apparatus as recited in claim 15, wherein said outer portion of said end stop has an annular collar-like configuration adapted to fit over the exterior of the end plug and make contact with an exterior surface portion thereof.

17. The apparatus as recited in claim 15, wherein said inner portion of said end stop has an elongated hollow tube-like configuration adapted to fit into the central passage of the end plug and make contact with an interior surface portion thereof.

18. The apparatus as recited in claim 15, wherein said inner portion of said end stop has an orifice adapted to communicate with the central passage of the end plug for supplying a flow of inert cover gas into the interior of the hollow tube to purge atmospheric air therefrom.

19. An apparatus for welding an end plug to a tube at an interface between an end of the tube and a reduced diameter trailing shoulder on the end plug, the end plug having a central passage defined therethrough and an enlarged diameter leading head portion of a diameter larger than that of the tube end and the reduced diameter trailing end plug shoulder, said welding apparatus comprising:
   (a) a stationary housing defining a welding chamber and an access opening at one end of said chamber, said access opening being of a diameter size large enough to allow passage therethrough, and insertion to and from a welding position within said chamber, of the tube end fitted with the end plug having the enlarged diameter head portion thereon and to create an annular air gap between the larger diameter of said access opening and the smaller diameter of the tube extending therethrough;
   (b) an elongated support member rotatably mounted to said housing and axially aligned with said access opening to said welding chamber, said support member having a channel defined therethrough for supplying a flow of inert cover gas;
   (c) an end stop mounted to an inner end of said support member and disposed at an end of said chamber opposite from and axially aligned with said access opening thereof, said end stop for supporting the end plug on the tube end at said welding position within said chamber, said end stop having an outer portion being configured to frictionally engage the exterior of the end plug about its enlarged diameter head portion and an inner portion being configured to frictionally engage the interior of the end plug within its central passage, said inner portion of said end stop having an orifice in communication with said channel of said support member for communicating the flow of inert gas from said support member channel into the interior of the tube via the end plug central passage for purging atmospheric air from the interior of the tube out through an opposite open end thereof;
   (d) a welding assembly having an electrode with a leading end;
   (e) means supporting said welding assembly with said electrode leading end disposed within said welding chamber, said supporting means being mounted on said housing for movement toward and away from said chamber for moving said electrode leading end toward and away from the tube and end plug between an extended working position wherein said electrode is disposed close enough to the tube end and end plug shoulder to perform a welding operation but also interfere with movement of the enlarged diameter head portion of the end plug past said electrode leading end and a retracted non-working position wherein said electrode is withdrawn far enough away from the tube and end plug to allow axial movement of the enlarged diameter head portion of the end plug past said electrode leading end;
   (f) drive means positioned adjacent said housing access opening outside said welding chamber and being operable to receive, engage and rotate the tube and thereby rotate the tube end and end plug within said welding chamber and said end stop engaged with the end plug therewith; and
   (g) means for supplying a flow of inert cover gas into said chamber and about the exterior of the tube end and end plug for purging atmosphere air from said chamber out through said annular air gap in said access opening of said housing about the tube.

20. A method of welding a tube to an end plug having a central passage defined therethrough, said welding method comprising the steps of:
   (a) moving an electrode of a welding assembly away from an extended working position to a retracted non-working position relative to a welding chamber defined in a housing;
   (b) inserting the end of the tube with the end plug fitted thereon through an access opening in the housing and into a welding position in the welding chamber of the housing;
   (c) placing the end plug in contact with a rotatable end stop disposed in the chamber opposite from and axially aligned with chamber access opening such that the end stop engages the end plug on the tube end at the welding position for supporting the same within the chamber;

(d) moving the electrode of the welding assembly away from its retracted non-working position to its extended working position relative to the welding chamber; and (e) rotating the tube and thereby the tube end and end plug within the welding chamber and therewith the end stop engaged with the end plug as the welding assembly is operated to perform a welding operation.

21. The method as recited in claim 20, wherein said placing step includes concurrently engaging an outer portion of the end stop with an exterior of the end plug and engaging an inner portion of the end stop with an interior of the end plug within its central passage.

22. The method as recited in claim 20, further comprising the step of:

supplying a flow of inert cover gas through the end stop into the interior of the hollow tube via the central passage of the end plug to purge atmospheric air therefrom.

* * * * *